Dec. 8, 1925.                     1,564,225
C. C. FARMER
GASKET
Filed Nov. 23, 1921

INVENTOR
CLYDE C. FARMER
BY *Wm. M. Cady*
ATTORNEY

Patented Dec. 8, 1925.

1,564,225

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

GASKET.

Application filed November 23, 1921. Serial No. 517,199.

*To all whom it may concern:*

Be it known that I, CLYDE C. FARMER, a citizen of the United States, residing at Pittsburgh, in the county of Allegheny and State of Pennsylvania, have invented new and useful Improvements in Gaskets, of which the following is a specification.

This invention relates to a gasket adapted to be applied to the face of a contact carrier of an electric train line coupler such as employed for connecting electric train lines between cars of a train.

The principal object of my invention is to provide an improved gasket of the above character which will effectively protect the contacts against the weather.

Figure 1:
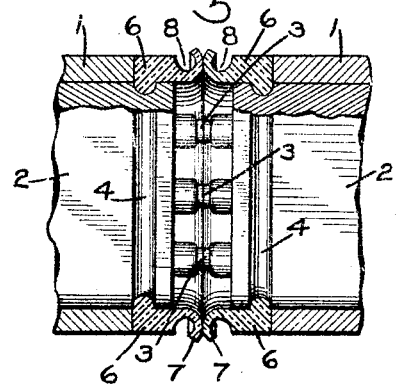
Figure 2:
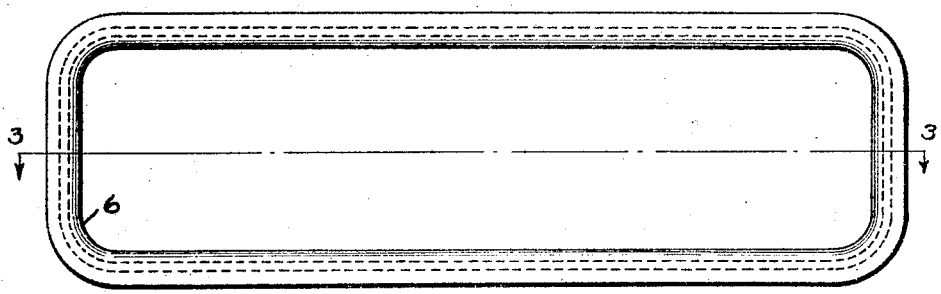
Figure 3:

In the accompanying drawing; Fig. 1 is a sectional view of portions of counterpart electric train line couplers in the coupled position, and showing my improved gasket applied thereto; Fig. 2 a plan or face view of the gasket; and Fig. 3 a section of the gasket on the line 3—3 of Fig. 2.

As shown in Fig. 1, the electric coupler may comprise a metallic casing 1, substantially rectangular in cross-section, and containing a block 2 of insulating material, within which are mounted a plurality of electric contacts 3. The projecting face end of the block 2 is provided with a groove 4 which continues around the four sides of the block and is adapted to receive the head 5 of a flexible rubber gasket 6. The gasket is provided with a relatively thin outwardly flaring portion 7 forming an exterior groove or cutter 8.

In the act of coupling electric train line couplers provided with the improved gasket, the flared portion 7 of the gasket on one coupler head engages the corresponding portion of the gasket on the counterpart coupler head, both flaring portions curling up as the contacts 3 approach engagement, until in the coupled position, the portions 7 of the gaskets assume the shape as shown in Fig. 1.

By means of the above described construction a high degree of flexibility is secured, so that the gaskets offer little resistance as the couplers are brought to the coupled position. This is an important feature, since it is highly desirable that the force required to bring the couplers to the coupled position be reduced to a minimum.

Any water, due to weather conditions, which may collect in the V-shaped trough formed by the abutting gaskets will be forced out into the gutters 8, when the couplers are uncoupled, by the rolling action of the flexible portion 7 on each other. It will also be noted that contact between the gaskets will be maintained during the uncoupling movement until the electric contacts are fully separated.

Having now described my invention, what I claim as new and desire to secure by Letters Patent, is:—

A coupler gasket for engagement with a counterpart gasket having a thin flexible arcuate portion with a free edge normally facing radially outward, the flexible portion curling rearwardly upon engagement with a counterpart gasket and the free edge moving forward to meet the free edge of the counterpart gasket at the instant of separation of the gaskets, whereby moisture collecting between the gaskets is expelled upon separation of the gaskets.

In testimony whereof I have hereunto set my hand.

CLYDE C. FARMER.